(12) United States Patent
Millsap

(10) Patent No.: US 6,514,029 B2
(45) Date of Patent: Feb. 4, 2003

(54) BALE LOADING ACCESSORY AND METHOD TO CONVERT A SMALL BALE STACK WAGON TO AND FROM A MID-SIZE OR BIG BALE STACK WAGON

(76) Inventor: Leland Keith Millsap, 2415 Fairview Ave., Fruitland, ID (US) 83619

( * ) Notice: Subject to any disclaimer, the term of this patent is extended or adjusted under 35 U.S.C. 154(b) by 0 days.

(21) Appl. No.: 09/826,520

(22) Filed: Apr. 4, 2001

(65) Prior Publication Data

US 2002/0146311 A1 Oct. 10, 2002

(51) Int. Cl.⁷ ............................................. A01D 90/02
(52) U.S. Cl. ..................... 414/24.5; 414/551; 414/555
(58) Field of Search ........................... 414/24.5, 24.6, 414/551, 555

(56) References Cited

U.S. PATENT DOCUMENTS

| 4,621,776 | A | * | 11/1986 | Hostetler | 414/24.6 |
| 4,630,986 | A | * | 12/1986 | Taylor | 414/24.6 |
| 4,741,656 | A | * | 5/1988 | Bishop | 414/24.6 |
| 4,789,289 | A | * | 12/1988 | Wilson | 414/24.6 |
| 4,909,694 | A | * | 3/1990 | Peters et al. | 414/24.5 |
| 5,288,193 | A | * | 2/1994 | Warburton et al. | 414/24.5 |
| 5,316,426 | A | * | 5/1994 | Dwyer et al. | 414/24.5 |
| 5,340,259 | A | * | 8/1994 | Flaskey | 414/24.5 |
| 5,405,229 | A | | 4/1995 | Tilley | |
| 5,478,194 | A | | 12/1995 | Tilley | |
| 5,690,461 | A | | 11/1997 | Tilley | |
| 5,697,758 | A | | 12/1997 | Tilley | |
| 5,899,652 | A | * | 5/1999 | Graham | 414/24.5 |
| 6,019,562 | A | | 2/2000 | Cheatham | |
| 6,024,534 | A | | 2/2000 | Stevenson | |
| 6,048,160 | A | | 4/2000 | Reist | |
| 6,312,205 | B1 | * | 11/2001 | Vandenberg | 414/24.5 |

* cited by examiner

Primary Examiner—Kathy Matecki
Assistant Examiner—Sang Kim
(74) Attorney, Agent, or Firm—Charles R. Clark

(57) ABSTRACT

A simple agricultural bale loading accessory that provides an efficient tool that should save time and labor costs over other existing loaders. The invention permits a novel lifting, flipping, rotating, and depositing of a mid-size or big bale in one continuous motion from the ground in the field onto and across a receiving wagon or vehicle. The invention is designed to facilitate the easy conversion of an existing small bale hay pickup and transport vehicle into a vehicle that can more easily handle mid-size and big bales.

15 Claims, 8 Drawing Sheets

BALE LOADING ACCESSORY AND METHOD TO CONVERT A SMALL BALE STACK WAGON TO AND FROM A MID-SIZE OR BIG BALE STACK WAGON

CROSS-REFERENCE TO RELATED APPLICATIONS

Not Applicable

STATEMENT REGARDING FEDERALLY-SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates to bale loading of a transport vehicle in an agricultural setting. The invention enables the lifting, flipping, rotating, and depositing of a mid-size or big bale from the ground in the field onto a wagon or vehicle for consolation into a load with other bales for transport from the field. The invention serves as a useful modification to existing bale transport vehicles such as the New Holland™ stack wagon series and other vehicles that incorporate rear-hinged loading tables. The invention in its preferred embodiment allows the quick and easy conversion of a stack wagon from a small bale pickup and transport vehicle to a mid-size or big bale pickup and transport vehicle. The invention also allows quick and easy conversion back to a small bale pickup and transport vehicle from a mid-size or big bale pickup and transport vehicle.

2. Description of Related Art

A number of big bale loading devices exist that can aid a person in loading wagons and other transport vehicles in the field. In U.S. Pat. No. 6,048,160 issued to Reist is disclosed a bale loading device. In U.S. Pat. No. 6,024,534 issued to Stevenson, the task of loading big bales and the conversion of a small bale stack wagon into a big bale stack wagon is also addressed. The prior devices are generally more cumbersome, bulky, and complex than the present invention. The present invention provides for a less complex loader and provides an efficient tool that should save time and labor costs over other existing loaders.

The present invention permits a novel lifting, flipping, rotating, and depositing of a bale in one continuous process from the ground onto and across a receiving table or surface of a vehicle.

BRIEF SUMMARY OF THE INVENTION

A principal objective of this invention is to provide a novel and improved bale loading accessory that is lightweight, compact, simple, low-maintenance, and reliable for use in a system that permits a farmer or other user to reversibly modify an existing small bale pickup and transport vehicle into a more efficient agricultural tool. In the preferred embodiment, the accessory is easily attached to the vehicle by four bolts and by the connection of four hydraulic lines.

A further object of this invention involves a method of converting small bale stack wagons such as manufactured by New Holland North America, Inc. (New Holland) into vehicles capable of loading mid-size or big bales.

Another object of this invention is to provide an accessory that will lift and deposit bales lengthwise across a receiving table of a vehicle equipped with the invention.

Additional and various other objects and advantages attained by the invention will become more apparent as the specification is read and the accompanying figures are reviewed.

The loader in the preferred embodiment uses two hydraulic actuators and four quick connect hydraulic lines. Each actuator requires the hook up of two hydraulic lines. The four hydraulic lines are ones that on a preexisting New Holland™ stack wagon are used to power two hydraulic devices that are associated with the operation of its small bale pickup device. The control of the invention's actuators may be accomplished by use of the same controls that would be used on an unmodified small bale stack wagon to control two hydraulic devices.

The present invention overcomes a significant problem that is encountered by many other loading devices. This significant problem is complex attachment to the wagon or vehicle. The present invention uses simple nuts and bolts and quick connect hydraulic lines to facilitate easy and reversible conversion of a preexisting stack wagon from a small bale loading wagon to a mid-size and big bale loading wagon and back to a small bale loading wagon. The invention allows the user to quickly and easily configure the wagon either as a small bale loading wagon or a mid-size or big bale loading wagon. After the modification as taught herein, subsequent conversion to or from one configuration to the other can be rapidly and easily accomplished.

Use of the accessory allows the stack wagon operator to approach bales in the field from their ends, the same orientation as the bales obtained when deposited on the ground by the baler that formed them as it progressed along a similar track to that now taken by the stack wagon. The accessory receives each bale with its longitudinal axis parallel to the longitudinal axis of the wagon (along the course of advance of the stack wagon in the field). The accessory then lifts, flips, rotates, and deposits the bale onto the wagon with the longitudinal axis of the bale after loading then being oriented perpendicular to the longitudinal axis of the stack wagon and parallel to the plane of the receiving table or receiving surface of the wagon or transport vehicle.

Use of the invention allows the bales to be placed in the orientation across the receiving table without the need of a complex turn table. Bales laying on their strings in the field can be retrieved from the field with a New Holland™ stack wagon or similar vehicle that has been modified and been equipped with the present invention and thereafter deposited in stable stacks again resting on their strings in the storage area. After deposit, the bales in the stack can be approached from the same side accessed by the vehicle when it deposited the bales.

The accessory in its preferred embodiment is mounted to and from a preexisting vehicle. When a New Holland® small bale stack wagon is modified, its preexisting small bale loader is unmounted from the vehicle before the instant invention is mounted. Generally a mounting fixture is attached to the vehicle preferably using nuts and bolts and then the invention is attached to the mounting fixture by using a plurality of bolts. The preferred embodiment uses hydraulic actuators, but other comparable devices including pneumatic actuators could be used.

DETAILED DESCRIPTION OF THE INVENTION

Figure 1:
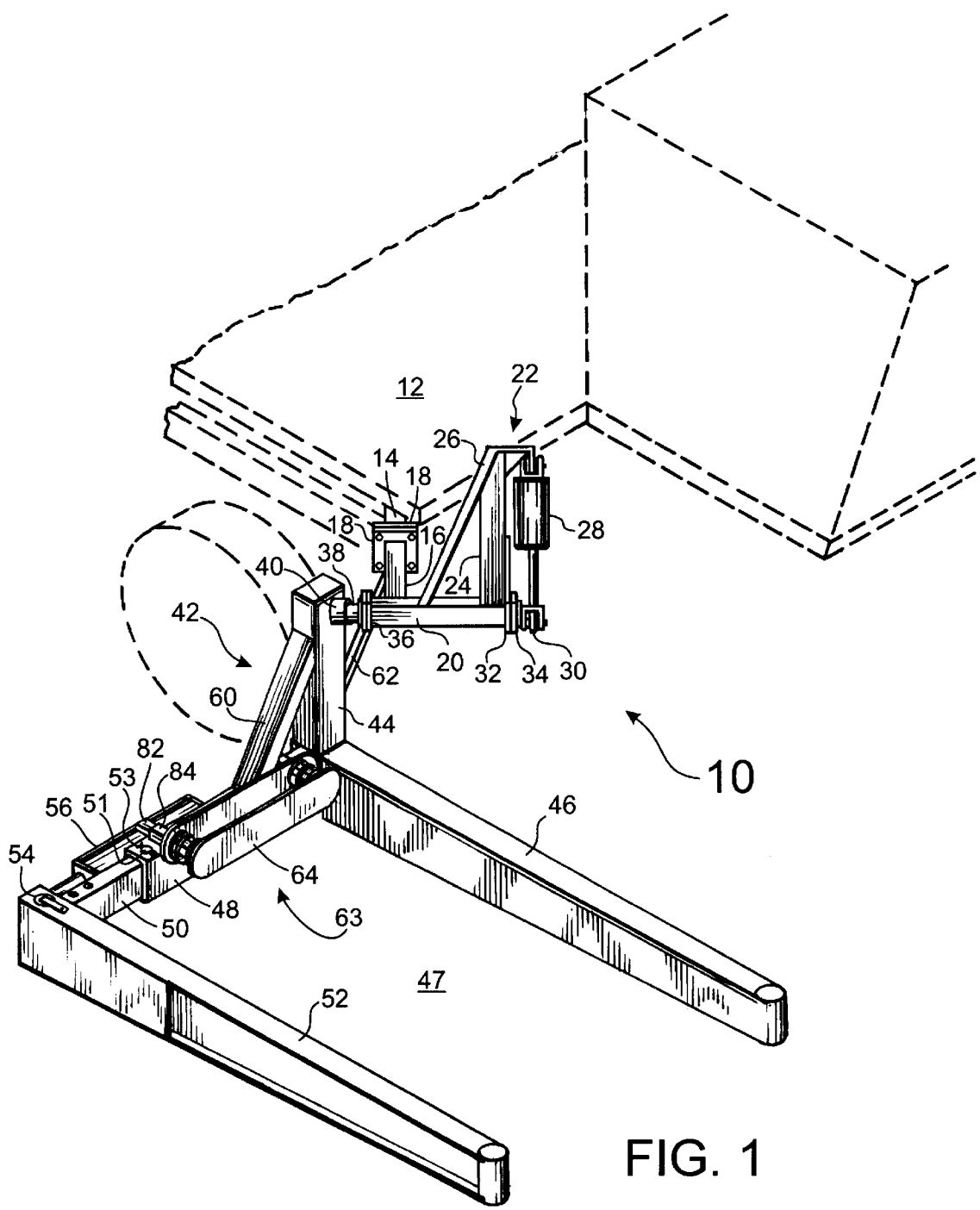
FIG. 1 is a perspective view of the right front quarter of a transport vehicle equipped with a bale loading accessory of the preferred embodiment in a bale receiving position showing the orientation of the accessory to a receiving table of the transport vehicle.

Referring to FIG. 1, the present invention is novel and provides a bale loading accessory 10 for a transport vehicle. A method of using the accessory 10 provides for lifting, flipping, rotating, and depositing a bale on said vehicle. The accessory 10 in its preferred embodiment is mounted beneath a bale receiving table 12 of the transport vehicle to a mounting fixture 14 that preferably is securely attached to the frame of the transport vehicle. Preferably the mounting fixture 14 is bolted to the frame of the vehicle. If a small bale loader is mounted on the transport vehicle, typically it is unmounted before the accessory 10 is mounted. The mounting fixture 14 has a support mounting plate 18 at one of its ends.

Figure 2:
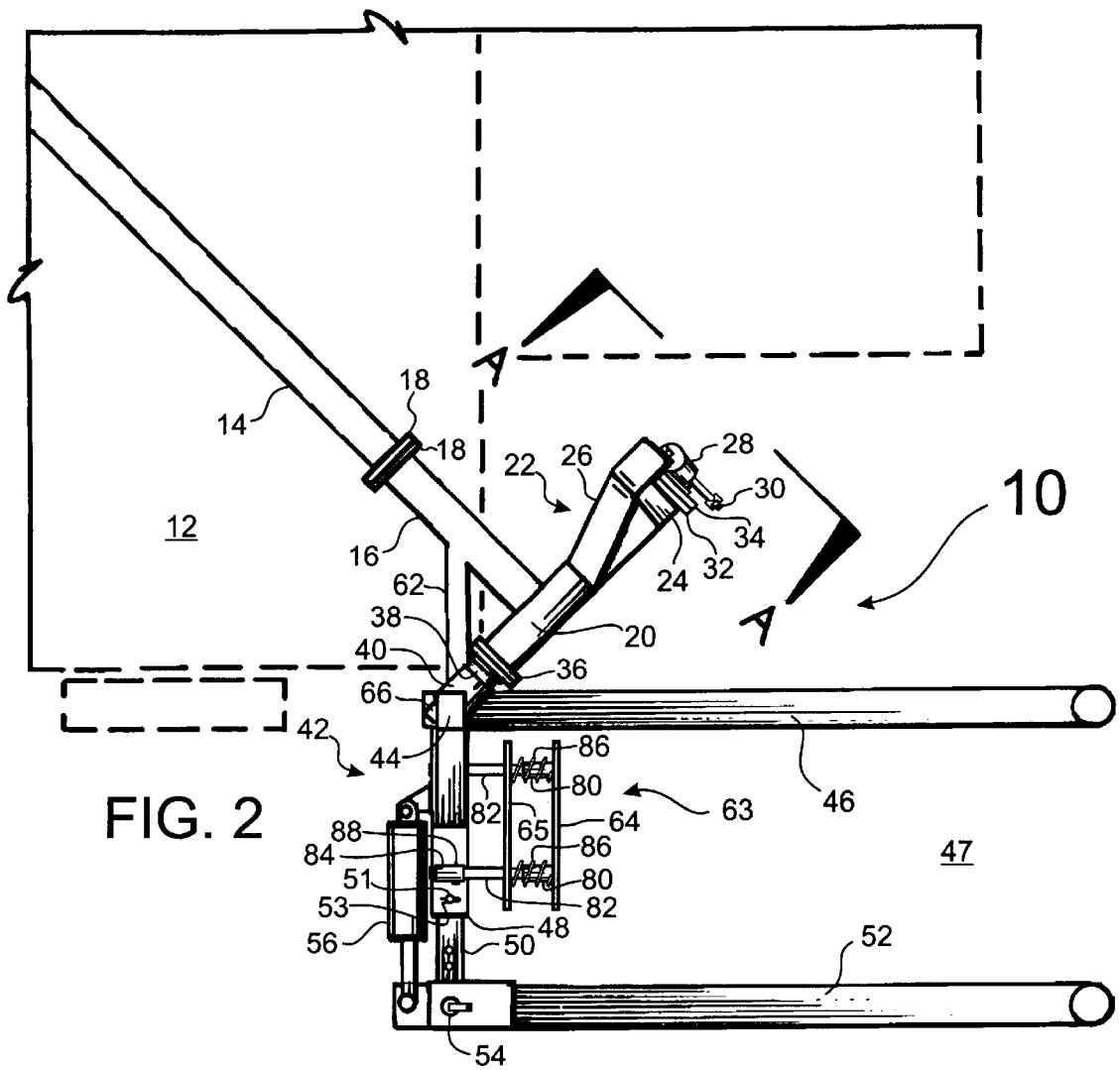
FIG. 2 is a top plan view of the accessory shown in FIG. 1 in the bale receiving position.

As shown in FIG. 2, the accessory 10 has a supporting member 16 that has a support mounting plate 18 attached to one of its ends. The two support mounting plates 18 are preferably bolted together with a plurality of nuts and bolts thereby securing the supporting member 16 to the mounting fixture 14 and thus securing the accessory 10 to the transport vehicle. Preferably the longitudinal axis of the supporting member 16 is diagonal (at an angle of about 45 degrees) to the longitudinal axis of the vehicle. Alternatively the support member 16 may be attached directly to the frame by welding or by nuts and bolts.

The supporting member 16 is attached preferably by welding to a bearing pipe 20. Preferably the longitudinal axis of the supporting member 16 is perpendicular to the longitudinal axis of the bearing pipe 20 and the longitudinal axis of the pipe is parallel to the plane of the surface upon which the vehicle rests. Additionally, the longitudinal axis of the bearing pipe 20 is aligned diagonally to the longitudinal axis of the vehicle preferably at an angle of about 45 degrees.

The bearing pipe 20 has two ends and preferably is fabricated from square tubing. A tower assembly 22 is attached preferably by welding to the bearing pipe 20 as shown in FIGS. 1, 2, 3, 5, 6, and 7.

Figure 3:
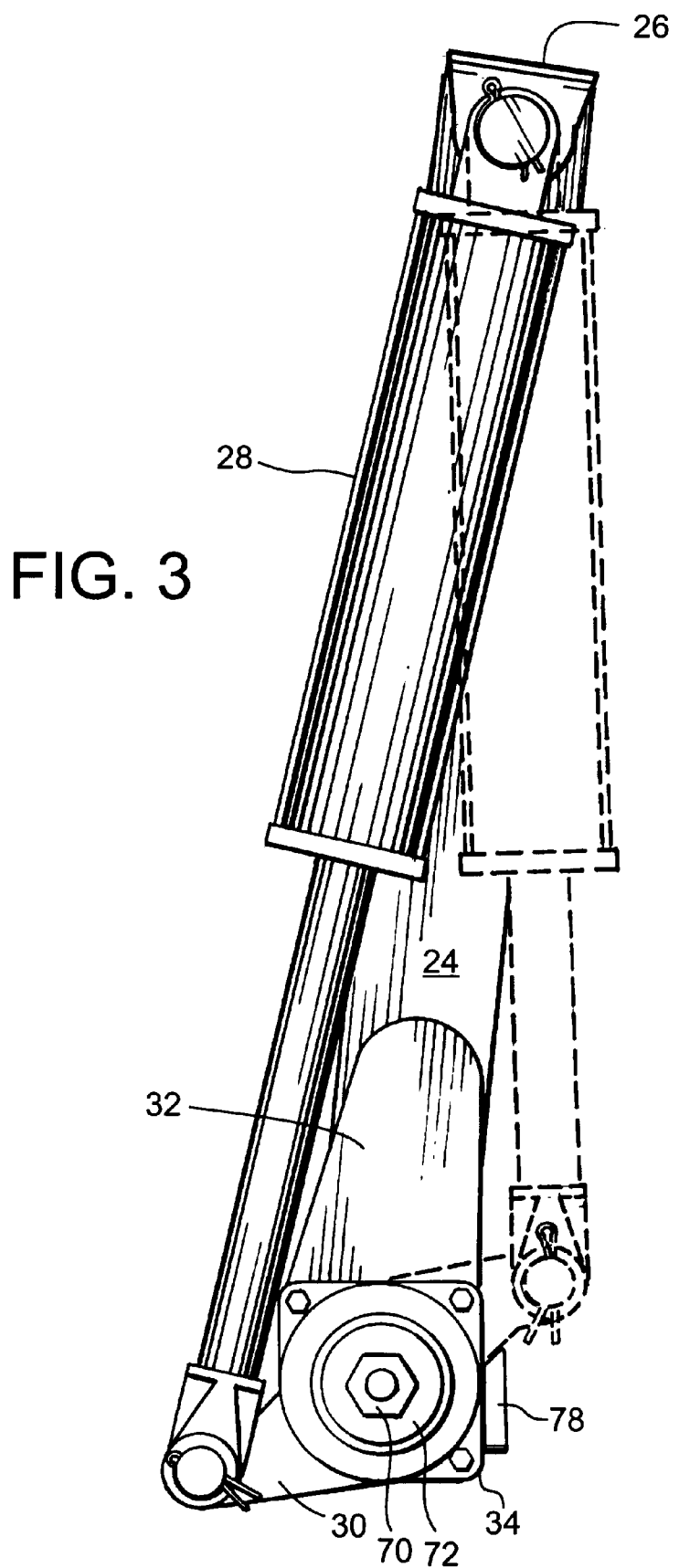
FIG. 3 is a view of a portion of the accessory showing the preferred embodiment of a tower assembly as viewed from direction A—A in FIG. 2 showing alternative positions of a lifting actuator and a rotational lever from a bale receiving position to a bale depositing position.

The tower assembly 22 has a tower 24 that preferably is attached by welding to the bearing pipe 20 perpendicular to the axis of the pipe as shown in FIG. 1 and preferably attached at an angle rotated around the axis of said pipe of approximately 8 degrees from vertical as shown in FIG. 3. The tower 24 can be attached at other appropriate angles including 90, 180, and 270 of rotation around the axis of the pipe from vertical. A bracket 26 is attached preferably by welding to the bearing pipe 20 and to the tower 24 as shown in FIGS. 1, 2, 3, 5, 6, and 7.

A lifting actuator 28 is attached between said bracket 26 and a rotational lever 30 by the use of pins and spring clips as well known in the art. In the preferred embodiment, the lifting actuator 28 is a hydraulic actuator and is connected to two hydraulic lines (not shown) and is powered and controlled by use of the hydraulic system of the modified vehicle. The hydraulic lines use quick disconnect fittings that are well known in the art.

In the best embodiment of the invention, a bearing mounting and tower reinforcing plate 32 is attached by welding to the tower 24 and to the bearing pipe 20 at the end of said pipe adjacent to the tower 24. A straight collar roller bearing 34 having a four bolt mounting flange is bolted to said reinforcing plate 32 as shown in FIGS. 3, 5, 6, and 7. A bearing mounting plate 36 is attached preferably by welding to the other end of said bearing pipe 20 as shown in FIGS. 1, 2, 5, 6, and 7.

A second straight collar roller bearing 34 is bolted to said bearing mounting plate 36. The bearing mounting and reinforcing plate 32 and the bearing mounting plate 36 each have an aperture (not shown) that allows a rotatable shaft 38 to be rotatably mounted through said apertures and said bearing pipe 20 in said bearings 34. The rotatable shaft 38 has a first shaft end 66 and a second shaft end 68 which extend out beyond the bearings 34.

A collar 40 is attached preferably by welding to the first shaft end 66 of said rotatable shaft 38. A pickup arm assembly 42 is attached to the collar 40 and to the first shaft end 66. The pickup arm assembly 42 has a vertical column 44. The vertical column 44 is attached preferably by welding to said collar 40 and said first shaft end 66 as best shown in FIGS. 1 and 2. The vertical column 44 is also attached preferably by welding to an inwardly disposed clamping arm 46 and to a crossbeam tube 48. In the best embodiment, a nesting tube 50 is slidingly received and adjustably secured within the crossbeam tube 48 in its free end away from said vertical column 44. The nesting tube 50 is adjustably secured within the crossbeam tube 48 by a crossbeam pin 51 as shown in FIGS. 1 and 2. The nesting tube 50 may be adjusted in or out of the crossbeam tube 48 by engaging appropriate cooperating holes in the crossbeam tube 48 and the nesting tube 50 with the crossbeam pin 51. The crossbeam pin 51 may be secured by a spring clip 53.

An outwardly disposed clamping arm 52 is pivotally connected to said nesting tube 50 by use of a pivot pin 54. A clamping actuator 56 is attached between the crossbeam tube 48 and the outwardly disposed clamping arm 52 as best shown in FIG. 2 by use of pins and clips as well known in the art. In the best embodiment, alternative mounting holes for the clamping actuator 56 are provided in the crossbeam tube 48 for use in the adjustment of the distance between the clamping arms 46 and 52. The clamping arms 46 and 52 are laterally spaced apart by the crossbeam tube 48 and the nesting tube 50 and the arms and tubes are generally coplanar. When in a bale receiving position, the clamping arms 46 and 52 are oriented generally parallel to each other and to the longitudinal axis of the vehicle and its direction of travel. In the preferred embodiment, a bale receiving opening 47 is defined when the pickup arm assembly 42 is in a bale receiving position by the clamping arms 46 and 52, the crossbeam tube 48, the nesting tube 50, and the bale cushioning assembly 63 as shown in FIGS. 1 and 2. In the preferred embodiment, the clamping actuator 56 is connected to two hydraulic lines (not shown) and is powered and controlled by use of the hydraulic system of the modified vehicle. The hydraulic lines use quick disconnect fittings that are well know in the art. Alternative mounting holes in the crossbeam tube 48 are best shown in FIG. 7.

In an alternative embodiment, the crossbeam tube 48 and the nesting tube 50 are replaced by a crossbeam (not shown) where said crossbeam is attached to said vertical column 44, said outwardly disposed clamping arm 52 is pivotally connected to said crossbeam, and said clamping actuator 56 is attached between said crossbeam and said outwardly disposed clamping arm 52.

Figure 5:
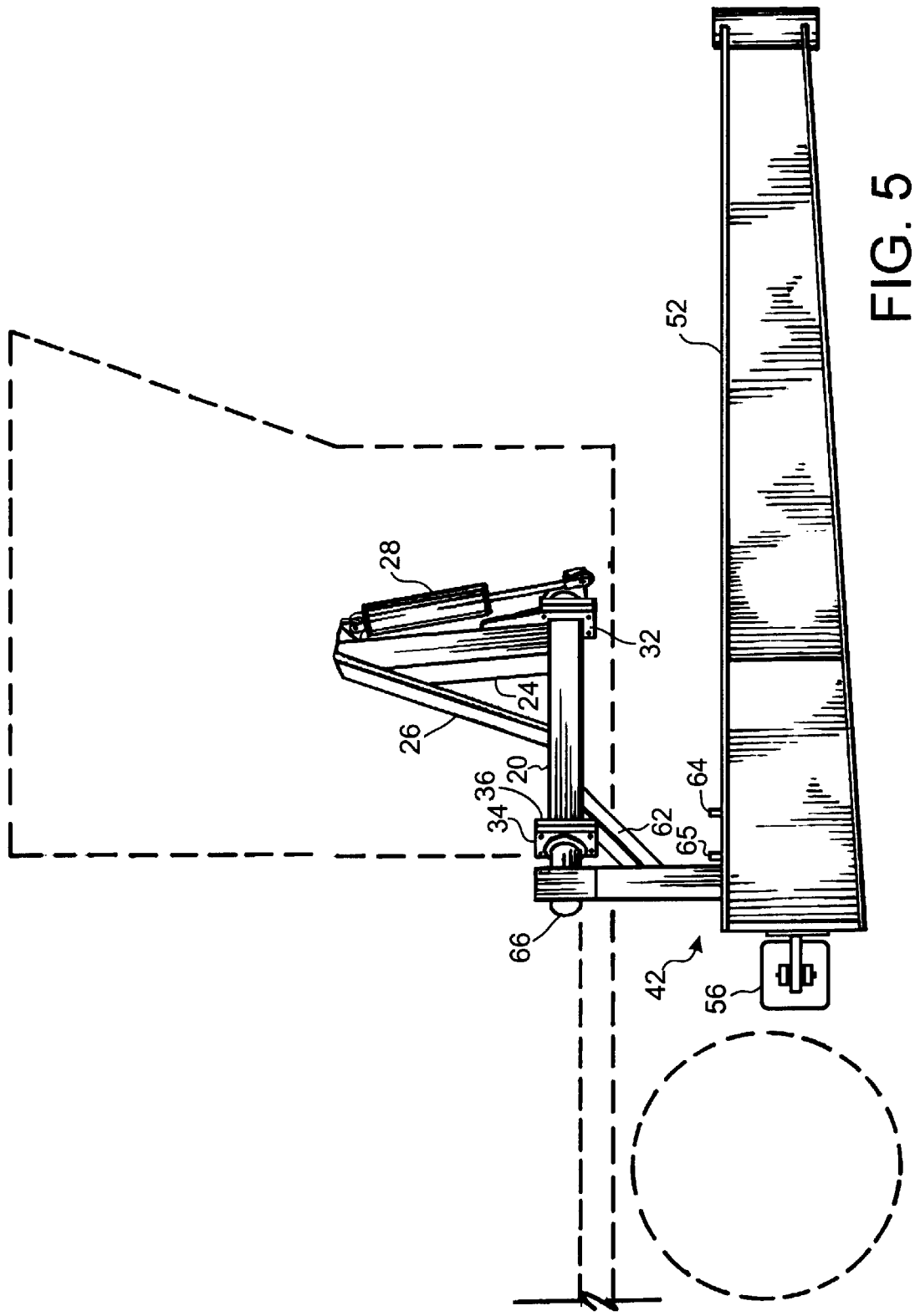
FIG. 5 is a side elevational view of the accessory shown in FIG. 1 in the bale receiving position.
Figure 7:
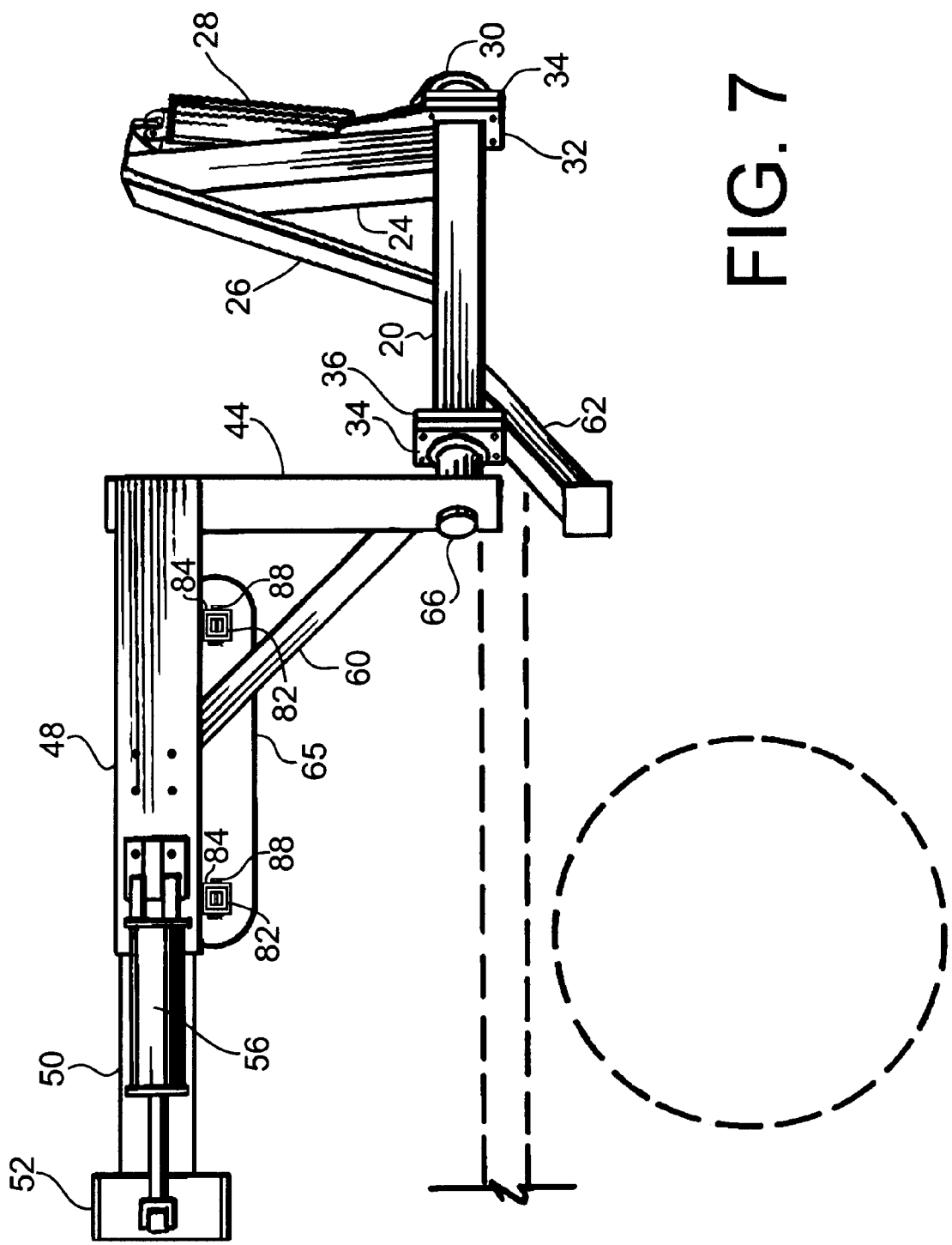
FIG. 7 is a side elevational view of the accessory shown in FIG. 1 in the bale depositing position.

A brace 60 is attached preferably by welding between the vertical column 44 and crossbeam tube 48 as best shown in FIGS. 1 and 7. A downstop 62 is attached to supporting member 16 and serves to stop downward rotation of the pickup arm assembly 42 in a preferred bale receiving position as shown in FIGS. 1, 2, and 5.

In the best embodiment of the invention, a bale is cushioned when received within a bale receiving opening 47 between the clamping arms 46 and 52. The bale cushioning is provided by a bale cushioning assembly 63 attached to the crossbeam tube 48. The bale cushioning assembly 63 is comprised of a bale cushion plate 64 attached preferably by welding to two receiver tubes 80 as shown in FIG. 2. Two nesting receiving tubes 82 that are laterally spaced and parallel to one another are inserted perpendicularly through apertures in a cushion backing plate 65 and secured to the backing plate preferably by welding. Two crossbeam receiving tubes 84 are laterally spaced and parallel to one another and attached across the top surface of the crossbeam tube 48. The crossbeam receiving tubes 84 each slidingly receives an end of one of the nesting receiving tubes 82. Each nesting receiving tube 82 is secured to a crossbeam receiving tube 84 by a crossbeam receiving tube pin 88 as shown in FIG. 7. The nesting receiving tubes 82 may be adjusted in concert in or out of the crossbeam receiving tubes 84 by engaging appropriate cooperating holes in the nesting receiving tubes 82 and the crossbeam receiving tubes 84 with two crossbeam receiving tube pins 88. The nesting tubes 82 each have a second end and said ends are slidingly received in the receiver tubes 80. The bale cushioning assembly 63 also has two coil springs 86 that are located between the bale cushioning plate 64 and the cushion backing plate 65. Each coil spring 86 respectively encircles and surrounds one of the receiver tubes 80 and its cooperating nesting receiving tube 82. In an alternative embodiment, the bale cushioning assembly 63 is attached to a crossbeam (not shown).

U-bolts (not shown) secure each coil spring 86 at each of its ends respectively to the bale cushion plate 64 and the cushion backing plate 65.

Referring to FIG. 3, the lifting actuator 28 is connected between the bracket 26 and the rotational lever 30. The range of rotation is preferably limited to approximately 180 degrees by mechanical stops: the downstop 62 (not shown in FIG. 3) and an upstop 78 that is welded to the bearing mounting and tower reinforcing plate 32. When the rotational lever 30 is in a bale depositing position, the lever 30 is stopped from further rotation by upstop 78. When the lifting actuator 28 is fully retracted, preferably the rotational lever 30 will have rotated through approximately 115 degrees from its position when the pickup arm assembly 42 (not shown in FIG. 3) is in a bale receiving position.

FIG. 3 also shows the tower 24 leaning to the right of vertical, but alternatively the tower 24 can be attached to the bearing pipe 20 at different rotational angles so long as the rotational lever 30 is correspondingly attached to the rotatable shaft 38 (not shown in FIG. 3) so that upon retraction of the lifting actuator 28 from the bale receiving position towards the bale depositing position, the lever will have rotated through approximately 115 degrees.

Figure 4:
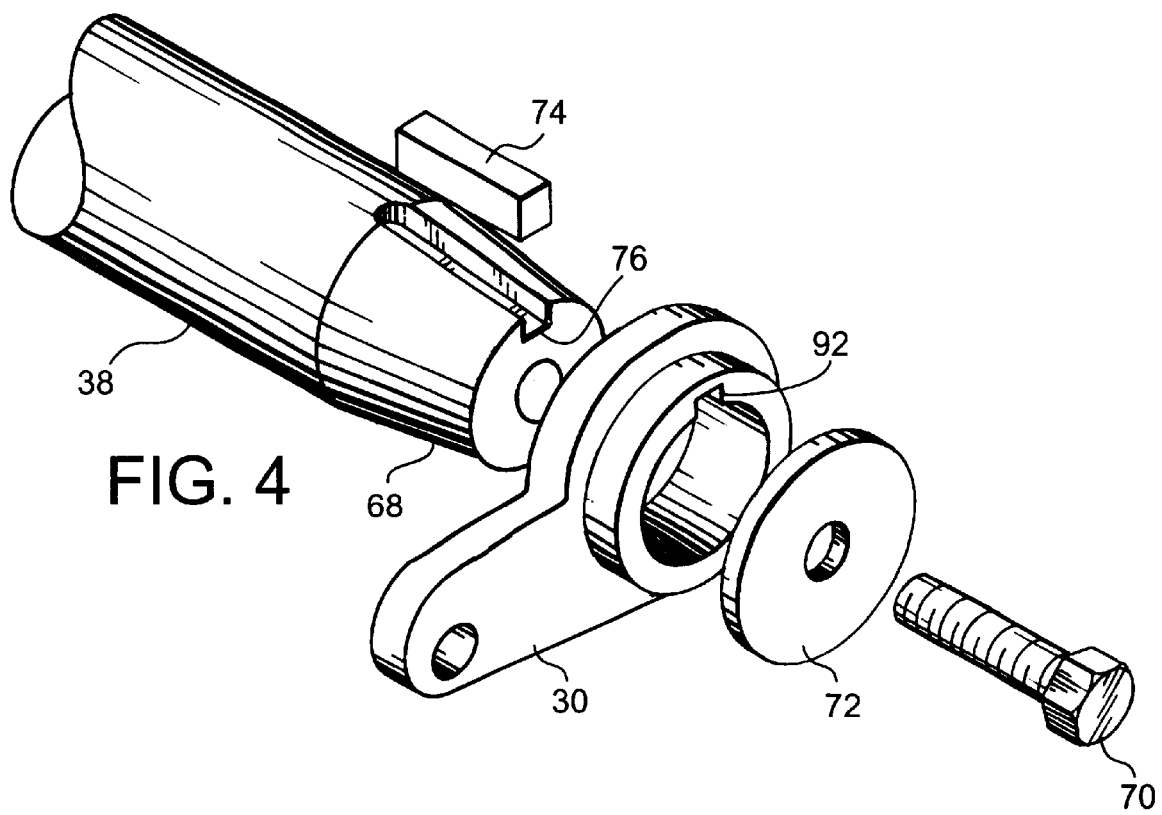
FIG. 4 is a perspective, exploded view of a portion of the accessory.

FIG. 4 is a perspective, exploded view of a portion of the accessory 10 that shows a second shaft end 68 of the rotatable shaft 38 to which a rotational lever 30 is attached by a washer 72 and a retention bolt 70. FIG. 4 also shows that preferably the second shaft end 68 is tapered to closely fit and engage the rotational lever 30 upon assembly and securing by the retention bolt 70. The second shaft end 68 is also preferably keyed to the rotational lever 30 with a key 74, a keyway 76 in the second shaft end 68, and a rotational lever keyway 92 in the rotational lever 30. Alternatively, the rotational lever 30 could be attached to the rotatable shaft 38 by welding.

Figure 6:
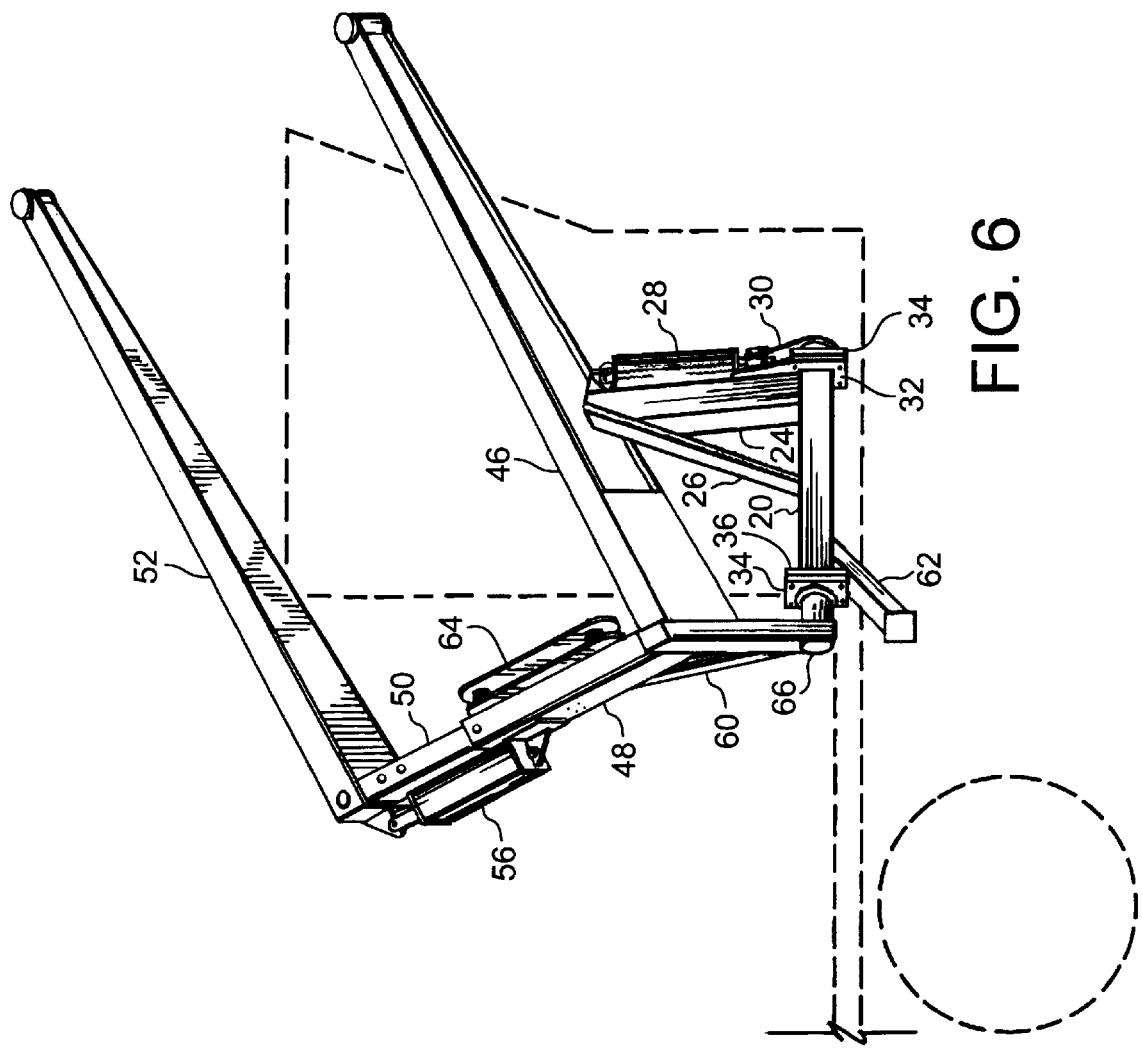
FIG. 6 is a side elevational view of the accessory shown in FIG. 1 that has been rotated upwardly through approximately 115 degrees of its range of approximately 180 degrees of rotational travel.

A bale is loaded after first being received in a bale receiving opening 47 between the clamping arms 46 and 52 when the arms are in a bale receiving position, at that time the clamping actuator 56 is extended causing the outwardly disposed clamping arm 52 to pivot towards the inwardly disposed clamping arm 46, thereby clamping the bale for lifting. Once the clamping of a bale is accomplished by the arms 46 and 52, the lifting actuator 28 is powered to full retraction as shown in FIG. 6 at which point the center of gravity of the bale being lifted and the pickup arm assembly 42 is past overcenter towards a bale depositing position such that when the lifting actuator 28 is unpowered the bale and pickup arm assembly 42 descend to the bale depositing position as shown in FIG. 7. During the loading process, the bale being loaded is lifted, flipped, and rotated about the longitudinal axis of the rotatable shaft 38 and the longitudinal axis of the bale transits from being parallel to the longitudinal axis of the vehicle to being perpendicular to the longitudinal axis of the vehicle. The clamping arms 46 and 52 are generally coplanar and when in the bale depositing position are oriented generally parallel to each other and perpendicular to the longitudinal axis of the vehicle as shown in FIG. 7.

After the bale reaches the bale depositing position on the receiving table or surface of the vehicle, the clamping actuator 56 may be powered to retract and thereby depositing the bale. Then the lifting actuator 28 may be powered to full retraction at which point without the added weight of the bale, the center of gravity of the pickup arm assembly 42 is past overcenter towards the bale receiving position so that when the lifting actuator 28 is unpowered the pickup assembly 42 descends to the bale receiving position as shown in FIGS. 1, 2, and 5.

After the first bale is deposited on a receiving table of a vehicle and the pickup arm assembly 42 returns to the bale receiving position, the receiving table may be cycled up and down to slide the bale towards the rear of the vehicle thereby clearing a position on the table for the next bale to be deposited.

Figure 8:
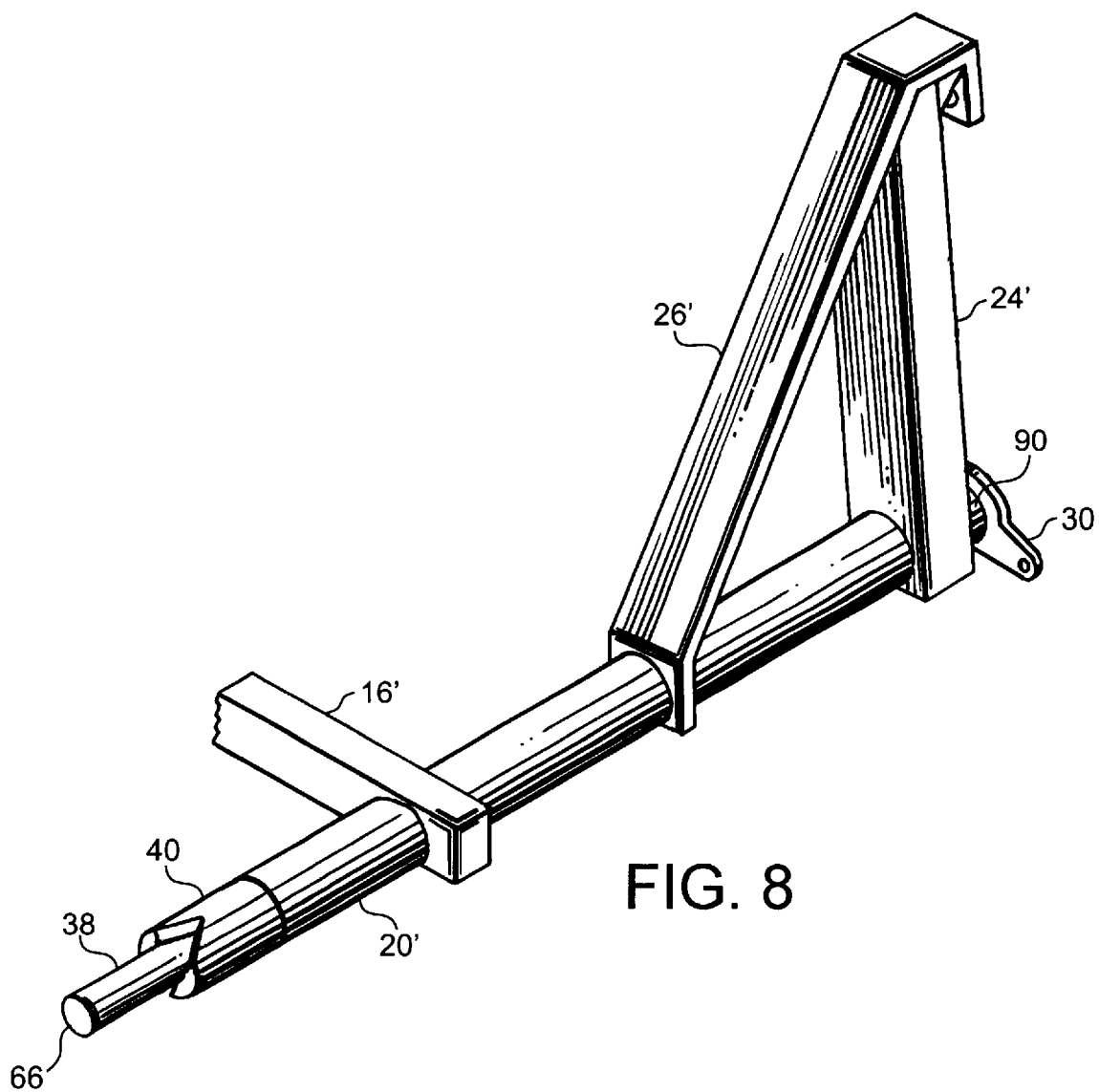
FIG. 8 is a perspective view of a portion of the accessory showing alternative embodiments of a tower assembly, a bearing pipe, and a supporting member.

Alternative embodiments of a supporting member 16', a bearing pipe 20', a bracket 26', and a tower 24' are shown in FIG. 8. FIG. 8. also shows that the invention may be embodied without roller bearings 34 and the associated mounting and reinforcing plate 32 and the bearing mounting plate 36. In an alternative embodiment, the rotatable shaft 38 rotates within a nesting round bearing pipe 20' that is adequately greased by use of zerk fittings. Collar 40 is welded to the rotatable shaft 38 and a spacer 90 is used on the rotatable shaft 38 between the rotational lever 30 and the tower 24'.

From the preceding, it should be apparent that the present invention provides a new bale loading accessory and methods that allow for convenient, easy modification of a bale transport vehicle to permit the lifting, flipping, rotating, and depositing of a bale from the ground in the field onto and across a receiving table or surface of the transport vehicle.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. A bale loading accessory for loading bales onto a vehicle comprising:
    a supporting member attached to said vehicle, said supporting member attached to a bearing pipe, a tower assembly attached to said bearing pipe, said tower assembly having a bracket, a rotatable shaft rotatably mounted through said bearing pipe, said shaft having a first shaft end and a second shaft end, a pickup arm assembly attached to said first shaft end, a rotational lever attached to said second shaft end, and a lifting actuator attached between said bracket and said rotational lever.

2. An accessory according to claim 1 wherein the longitudinal axis of said bearing pipe is angled at about 45 degrees to the longitudinal axis of said vehicle.

3. An accessory according to claim 1 wherein the longitudinal axis of said supporting member is diagonal to the longitudinal axis of said vehicle and is perpendicular to the longitudinal axis of said bearing pipe.

4. An accessory according to claim 3 wherein said pickup arm assembly comprises a vertical column, said vertical column attached to a collar and to said first shaft end, said vertical column attached to an inwardly disposed clamping arm and to a crossbeam tube, a nesting tube slidingly received and adjustably secured within said crossbeam tube in its free end away from said vertical column, an outwardly disposed clamping arm pivotally connected to said nesting tube by a pivot pin, and a clamping actuator attached between said crossbeam tube and said outwardly disposed clamping arm.

5. An accessory according to claim 4 wherein said clamping arms are generally coplanar and when in a bale receiving position are oriented generally parallel to each other and to the longitudinal axis of said vehicle.

6. An accessory according to claim 4 wherein said clamping arms are generally coplanar and when in a bale depositing position are oriented generally parallel to each other and perpendicular to the longitudinal axis of said vehicle.

7. An accessory according to claim 4 further comprising a bale cushioning assembly attached to said crossbeam tube.

8. An accessory according to claim 7 wherein said bale cushioning assembly comprises two crossbeam receiving tubes laterally spaced and parallel to one another and attached to said crossbeam tube, two nesting receiving tubes laterally spaced and parallel to one another, said nesting receiving tubes inserted perpendicularly through apertures in a cushion backing plate and secured to said backing plate, said crossbeam receiving tubes each slidingly receives an end of one of said nesting receiving tubes, said nesting receiving tubes secured to said crossbeam receiving tubes by crossbeam receiving tube pins, a bale cushion plate attached to two receiver tubes, said nesting tubes each having a second end and said second ends slidingly received in said receiver tubes, two coil springs located between said bale cushioning plate and said cushion backing plate, said coil springs each respectively encircles and surrounds one of said receiver tubes and its cooperating nesting receiving tube.

9. An accessory according to claim 1 wherein said pickup arm assembly comprises a vertical column, said vertical column attached to a collar and to said first shaft end, said vertical column attached to an inwardly disposed clamping arm and to a crossbeam tube, a nesting tube slidingly received and adjustably secured within said crossbeam tube in its free end away from said vertical column, an outwardly disposed clamping arm pivotally connected to said nesting tube by a pivot pin, and a clamping actuator attached between said crossbeam tube and said outwardly disposed clamping arm.

10. An accessory according to claim 9 wherein said clamping arms are generally coplanar and when in a bale receiving position are oriented generally parallel to each other and to the longitudinal axis of said vehicle.

11. An accessory according to claim 9 wherein said clamping arms are generally coplanar and when in a bale depositing position are oriented generally parallel to each other and perpendicular to the longitudinal axis of said vehicle.

12. An accessory according to claim 9 further comprising a bale cushioning assembly attached to said crossbeam tube.

13. An accessory according to claim 12 wherein said bale cushioning assembly comprises two crossbeam receiving tubes laterally spaced and parallel to one another and attached to said crossbeam tube, two nesting receiving tubes laterally spaced and parallel to one another, said nesting receiving tubes inserted perpendicularly through apertures in a cushion backing plate and secured to said backing plate, said crossbeam receiving tubes each slidingly receives an end of one of said nesting receiving tubes, said nesting receiving tubes secured to said crossbeam receiving tubes by crossbeam receiving tube pins, a bale cushion plate attached to two receiver tubes, said nesting tubes each having a second end and said second ends slidingly received in said receiver tubes, two coil springs located between said bale cushioning plate and said cushion backing plate, said coil springs each respectively encircles and surrounds one of said receiver tubes and its cooperating nesting receiving tube.

14. A method to convert a small bale stack wagon to and from a mid-size or big bale stack wagon comprising:
    (a) unmounting a small bale loader;
    (b) providing a bale loading accessory having a supporting member, said supporting member attached to a bearing pipe, a tower assembly attached to said bearing pipe, said tower assembly having a bracket, a rotatable shaft rotatably mounted through said bearing pipe, said shaft having a first shaft end and a second shaft end, a pickup arm assembly attached to said first shaft end, a rotational lever attached to said second shaft end, and a lifting actuator attached between said bracket and said rotational lever;
        said pickup arm assembly having a vertical column, said vertical column attached to a collar and to said first shaft end, said vertical column attached to an inwardly disposed clamping arm and to a crossbeam tube, a nesting tube slidingly received and adjustably secured within said crossbeam tube in its free end away from said vertical column, an outwardly disposed clamping arm pivotally connected to said nesting tube by a pivot pin, and a clamping actuator attached between said crossbeam tube and said outwardly disposed clamping arm;

(c) attaching said accessory to said wagon; and (d) connecting two hydraulic lines to each of said actuators; said hydraulic lines powered and controlled by a hydraulic system of the modified vehicle.

15. A method for loading a bale onto a transport vehicle, said vehicle having a receiving table:

(a) providing a vehicle equipped with a bale loading accessory, said accessory having a supporting member, said supporting member attached to a bearing pipe, a tower assembly attached to said bearing pipe, said tower assembly having a bracket, a rotatable shaft rotatably mounted through said bearing pipe, said shaft having a first shaft end and a second shaft end, a pickup arm assembly attached to said first shaft end, a rotational lever attached to said second shaft end, and a lifting actuator attached between said bracket and said rotational lever;

said pickup arm assembly having a vertical column, said vertical column attached to a collar and to said first shaft end, said vertical column attached to an inwardly disposed clamping arm and to a crossbeam tube, a nesting tube slidingly received and adjustably secured within said crossbeam tube in its free end away from said vertical column, an outwardly disposed clamping arm pivotally connected to said nesting tube by a pivot pin, and a clamping actuator attached between said crossbeam tube and said outwardly disposed clamping arm;

(b) receiving a bale in a receiving opening between said clamping arms when said arms are in a bale receiving position;

(c) extending said clamping actuator thereby clamping said bale;

(d) powering said lifting actuator to full retraction at which point the center of gravity of the bale being lifted and said pickup arm assembly is past overcenter towards a bale depositing position;

(e) unpowering said lifting actuator whereby said bale and said pickup arm assembly descend to a bale depositing position on said receiving table of said vehicle;

(f) powering said clamping actuator to retract thereby depositing said bale, said bale having been lifted, flipped, and rotated about the longitudinal axis of said rotatable shaft and the longitudinal axis of said bale transits from being parallel to the longitudinal axis of said vehicle to being perpendicular to the longitudinal axis of said vehicle;

(g) powering said lifting actuator to full retraction at which point without the added weight of said bale, the center of gravity of said pickup arm assembly is past overcenter towards said bale receiving position; and (h) unpowering said lifting actuator whereby the pickup arm assembly descends to said bale receiving position.

* * * * *